Jan. 27, 1959  G. W. WALTON  2,870,889
OVERRUNNING CLUTCH
Filed June 16, 1955
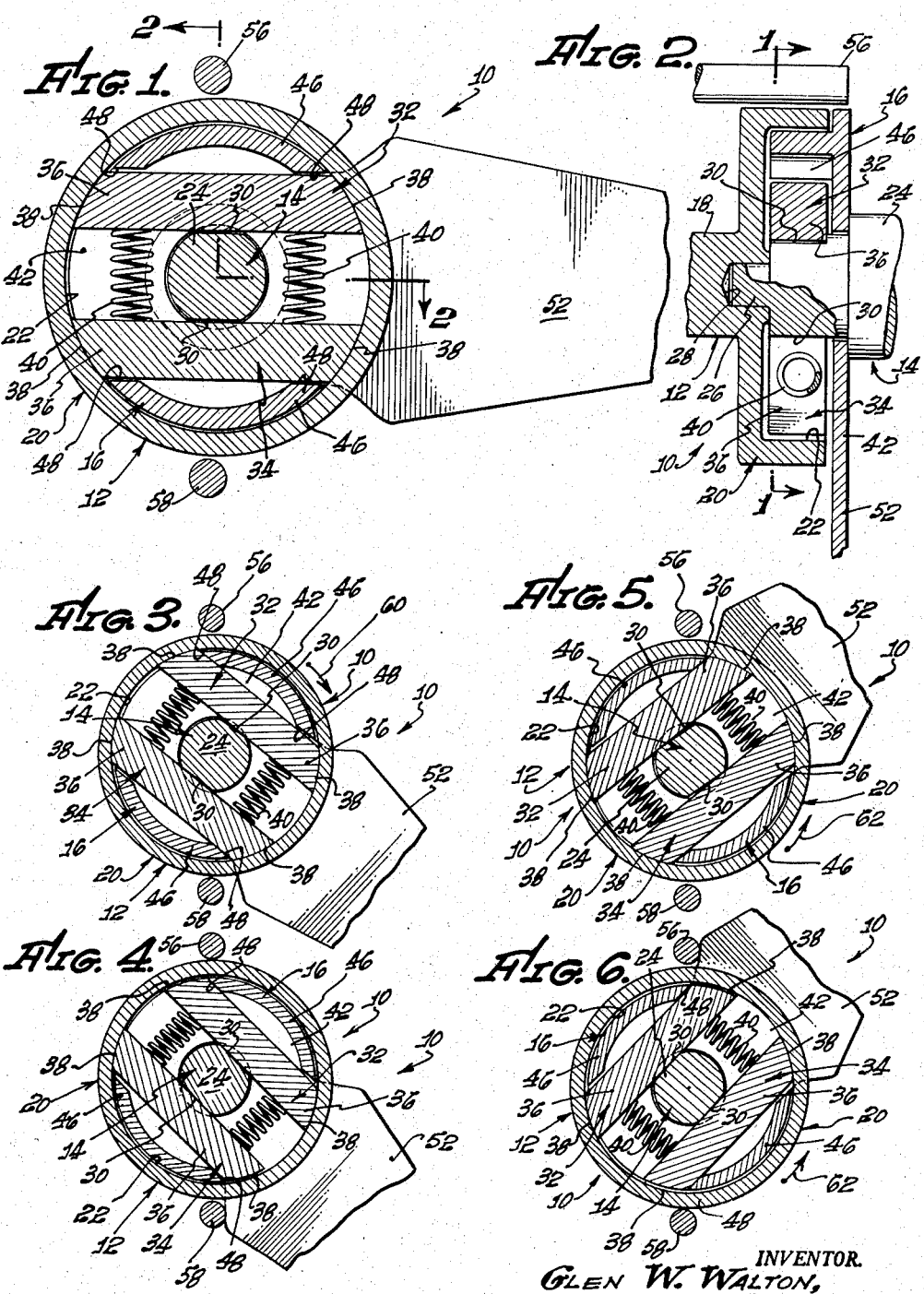
INVENTOR.
GLEN W. WALTON,
BY Thomas P. Mahoney
ATTORNEY.

United States Patent Office 2,870,889
Patented Jan. 27, 1959

2,870,889

OVERRUNNING CLUTCH

Glen W. Walton, Culver City, Calif., assignor to Telecomputing Corporation, Los Angeles, Calif., a corporation of California Application June 16, 1955, Serial No. 515,897

4 Claims. (Cl. 192—22)

This invention relates to a bidirectional overrunning clutch and to such a clutch having means associated therewith for automatically releasing the clutch at predetermined limits of movement of a device driven by said clutch.

In the manufacture of conventional overrunning clutches incorporating balls or rollers as the clutching elements, it is necessary to maintain relatively close tolerances because the contact between the balls or rollers and the clutching surface is substantially linear.

It is, therefore, an object of my invention to provide a bidirectional overrunning clutch which can be easily and cheaply manufactured and which can also be manufactured without the adherence to the high tolerances inherent in the manufacture of conventional clutches. Although my invention is described as incorporated in a bidirectional overrunning clutch, it is, of course, possible to incorporate the teachings of my invention in a unidirectional rather than a bidirectional clutch.

Because of the substantially linear contact between the ball or roller clutch elements in conventional clutch constructions of the overrunning type, a relatively large number of such elements must be utilized to obtain the necessary clutching action against the clutch surface since the sum of the contact areas is relatively small.

It is, therefore, an object of my invention to provide an overrunning clutch including non-rotational clutch elements provided with relatively large contact surfaces for engagement with the clutch area to permit the number of clutching elements to be substantially reduced and to obtain, nevertheless, a much more efficient clutch because of the relatively large area, rather than lineal, contact obtained.

Since conventional overrunning clutches utilizing rotary elements such as balls and rollers for clutching elements depend upon the linear contact of the balls or rollers for the clutching action, the problem of lubrication of such clutches is a serious one and it is necessary to carefully select the lubricant utilized and to renew said lubricant at frequent intervals.

Another object of my invention is the provision of an overrunning clutch which includes an elongated clutch element having contact surfaces on its opposite ends engageable with opposite portions of a clutching area, the contact surfaces being relatively large to engage the clutching areas and, therefore, not being subject to the need for a particular type of lubricant since the relatively large surfaces provided eliminate the criticality which exists where only linear contact with the clutching area is established.

A further object of my invention is the provision of an overrunning clutch which can be provided in much smaller sizes to transmit the same torque as larger, conventional overrunning clutches incorporating rotational clutch elements because of the larger area contact achieved by the use of non-rotational clutch elements.

An additional object of my invention is the provision of an overrunning clutch which is characterized by resistance to wear on the contact surfaces of the clutch elements and the juxtaposed clutching area by virtue of the relatively large clutch area and contact surfaces and which is, therefore, not subject to the galling and/or brinelling characteristic of clutches utilizing clutch elements providing only linear contact.

Another object of my invention is the provision of an overrunning clutch which, because of the relatively large contact surfaces of the clutch elements and the relatively large clutching areas engageable thereby, will function properly despite the fact that the clutch elements have become considerably worn.

A further object of my invention is the provision of a clutch of the aforementioned character which will release easily under the action of the release means incorporated therein, despite the subjection of the clutch to relatively high loads since the large contact surfaces of the clutch elements do not tend to bind and stick in the same manner as conventional rotary clutch elements.

Because of the large contact surfaces on the clutch elements incorporated in the overrunning clutch of my invention, cocking of the clutch element to bind the contact surfaces on the extremities thereof against the contiguous clutching area is eliminated and, therefore, there is not encountered the unequal wear of the clutch elements nor the locking under load characteristic of conventional overrunning clutches.

Furthermore, because of the relatively large contact surfaces on the opposite extremities of the clutch elements incorporated in the overrunning clutch of my invention, it is possible to reduce the axial dimensions of the clutch and to incorporate the same in a much smaller envelope which is significant where space requirements are critical.

Because the need for close tolerances during manufacture has been eliminated and because the component parts are thus cheaper to manufacture, it is possible to provide a smaller and more efficient clutch to transmit the same torque as a larger, more expensive, conventional clutch.

Other objects and advantages of my invention will be apparent from the following specification and the accompanying drawing which is for the purpose of illustration only and in which:

Fig. 1 is a vertical, partly sectional view taken on the broken line 1—1 of Fig. 2;

Fig. 2 is a vertical, partly sectional view taken on the broken line 2—2 of Fig. 1;

Fig. 3 is a sectional view showing the driving and driven members and the clutch rotating in a clockwise direction;

Fig. 4 is a view similar to Fig. 3 but showing the action of the release means in terminating the rotation of the clutch shown in Fig. 3;

Fig. 5 is a view similar to Fig. 3 but showing the rotation of the driving and driven members of the clutch in a counterclockwise direction; and Fig. 6 is a view similar to Fig. 4 but showing the release of the clutch from the driven member by the action of the release means at the opposite extremity of movement from that shown in Fig. 4.

Referring to the drawing and particularly to Figs. 1–2 thereof, I show a bidirectional overrunning clutch 10 constructed in accordance with the teachings of my invention and designed to operatively connect and transmit torque from a driving member 12 to a driven member 14. The driving member 12 is connected to a source of power such as an electric motor, not shown, and the driven member 14 is connected to a device, such as a valve, not shown, to be energized by the power supplied from said electric motor through the clutch 10.

Since it is desired that the valve, not shown, connected to the driven member 14 be rotated between predetermined limits of movement in both forward and reverse directions, release means, indicated generally at 16, is provided in the clutch 10 and serves to disconnect the driving from the driven member when the driven member, and the driven object associated therewith, has reached one or the other of its predetermined limits of movement.

In the particular embodiment of the invention disclosed herein, the driving member 12 includes a shaft 18, as best shown in Fig. 2 of the drawing, said shaft having a cylindrical housing 20 formed integrally therewith and constituting a housing for the operative elements of the clutch 10. In the drawing, the various elements of the clutch 10 are shown more widely spaced apart than would, of course, be true in the actual device for the purpose of clarity but it is, of course, to be understood that the actual clearances are obviously much smaller than those shown.

The inner, axially directed wall of the housing 20 provides a continuous annular clutching or contact area 22. The driven member 14 is provided with a shaft 24 having a cylindrical boss 26 on its inner extremity which is journaled in a bore 28 in the driving member 12.

The shaft 24 has formed upon the diametrically opposite sides thereof engageable portions or flats 30 which extend between clutch elements 32 and 34 disposed on opposite sides of the axis of rotation of said shaft and which are engageable, in a manner to be described in greater detail below, by said flats on said shaft.

Each of the clutch elements 32 and 34 is constituted by an elongated bar 36 which subtends an arc constituted by a portion of the annular clutching area 22 and which is provided on its opposite extremities with arcuate contact surfaces 38, the arc upon which said surfaces is formed being of substantially the same radius as the annular contact or clutching area 22. Compression springs 40 disposed on opposite sides of the axis of rotation of the shaft 24 have their opposite ends seated upon the oppositely disposed clutch elements or shoes 32 and 34 and bias said elements outwardly to urge the contact surfaces 38 thereupon into engagement with the annular contact or clutching areas 22 of the housing 20.

The release means 16, as best shown in Figs. 1 and 2 of the drawing, includes a substantially annular plate 42 which overlies the open end of the housing 20 and is journaled upon a reduced portion of the shaft 24. Formed integrally with the plate 42 is a pair of axially directed, arcuately configured releasing lugs or fingers 46, said fingers extending into the confines of the housing 20 and being provided at their opposite extremities with flat surfaces 48 contiguous to the similarly flat surfaces on the clutch elements or shoes 32 and 34.

A radially extending releasing arm 52 is provided upon the plate 42 and extends outwardly therefrom. Juxtaposed to the path of rotation of the housing 20 and adapted to be engaged by the releasing arm 52 are stop pins 56 and 58 which define opposite limits of movement of the driven member 14 and which are engageable by opposite edges of the releasing arm 52 to cause the de-energization of the clutch 10 and the release of the driven member 14 from the driving member 12.

The motor, not shown, utilized to rotate the driving member 12 includes two energizing coils, a forward and reverse coil, so that by the throwing of a switch connected thereto in the appropriate direction, the motor itself can be energized to rotate in either a forward or reverse direction. Upon forward rotation of the motor, the driving member 12 will be rotated in a clockwise direction, as indicated by the arrow 60 in Fig. 3 of the drawing. Concomitant rotation of the housing 20 will take place. Since the clutch elements or shoes 32 and 34 are biased outwardly by the action of the springs 40 so that the contact surfaces 38 thereof engage the clutching areas on the interior wall of the housing 20, the clutch elements 32 and 34 will rotate concomitantly with the housing 20.

Therefore, the flat inner sides of the clutch elements 32 and 34 intermediate the ends thereof will engage the oppositely disposed flats 30 on the shaft 24 to cause the rotation of the driven member 14 in a clockwise direction. It will be noted that, as best shown in Fig. 3 of the drawing, the engagement of the clutch elements or shoes 32 and 34 with the oppositely disposed flats 30 on the shaft 24 is substantially linear and approximately at the ends of the flats, but that the shaft 24 cannot rotate relative to the clutch shoes or elements 32 and 34 because of the restricted space provided for the flats 30 on the shaft between the inner sides of said clutch shoes or elements.

Because the contact surfaces 38 on the clutch shoes or elements 32 and 34 are always in engagement with the annular contact or clutching areas 22, there is relatively little, if any, lost motion encountered between the driving member 12 and the driven member 14 because of the fact that no travel of the clutch shoes or elements 32 and 34 is necessary to bring them into operative relationship with the annular clutching area 22 on the housing 20. It can also be observed that the relatively large contact surfaces 38 on the opposite extremities of the clutch shoes or elements 32 and 34 tends to distribute the load over a relatively large area of the clutching surface 22, eliminating galling and wear characteristic of devices incorporating rotary elements such as rollers and balls.

During rotation of the clutch 10, the trailing flat surfaces 48 on the release fingers 46 are engaged by the exterior flat surfaces on the clutch shoes or elements 32 and 34 and, as best shown in Fig. 3 of the drawing, are carried around with the remaining elements of the clutch 10 to cause the releasing arm 52 to move in an arc. Ultimately, as best shown in Fig. 4 of the drawing, the releasing arm 52 engages the lower stop pin 58 to prevent further rotation of said arm, the plate 42 connected thereto, and the releasing lugs or fingers 46. Cessation of movement of the releasing fingers 46 prevents further rotational movement of the clutch shoes or elements 32 and 34 and the clutch shoes or elements 32 and 34 are urged inwardly toward the axis of the shaft 24 to release the contact surfaces 38 thereof from operative engagement with the annular clutching surface 22.

It will be noted that the inward movement of the clutch elements 32 and 34 is limited by the complete engagement of the inner surfaces of said elements upon the flats 30 on the opposite sides of the shaft 24 and that, therefore, there must always be provided a sufficient space between said flats and said inner surfaces to permit such inward and releasing movement.

When the contact surfaces 38 on the opposite extremities of the clutch elements or shoes 32 and 34 are thus removed from operative engagement with the annular clutching area 22 on the interior of the housing 20, the operative relationship between the driving member 12 and the driven member 14 ceases and the driving member 12 can continue rotating, can be halted by the automatic de-energization of its associated motor, or can coast to a stop without affecting the position of the driven member 14.

The operation of the clutch 10 in the counterclockwise direction is indicated by the arrow 62 in Fig. 5 of the drawing and is identical with that when the clutch 10 is rotated in a clockwise direction, with the exception that the previous trailing ends of the clutch fingers become the leading ends and that opposite portions of the flats 30 are engaged by the intermediate portions of the clutch shoes or elements 32 and 34. Similarly, when the releasing handle 52 engages the upper stop pin 56, the trailing ends of the releasing fingers 46 dislodge the clutch elements 32 and 34 from operative relationship with the clutching surface 22 on the interior of the housing 20 and release the driven member 14 from operative relationship with the driving member 12.

Since the flats 30 are gripped between the inner surfaces of the clutch elements 32 and 34, further rotation of the shaft 24 and the driven member 14 connected thereto is prevented and overtravel of the driving member 12 will have no effect on the driven member 14.

I thus provide by my invention an overrunning clutch which is characterized by a minimum number of component parts and by the simplicity of construction of said component parts. Moreover, by virtue of the use of clutch elements having large contact surfaces thereupon creating contact with a clutching surface in the clutch, the criticality of lubrication characteristic of prior art structures is eliminated. Because cocking of the clutch elements is obviated because of the length thereof and the large area of the contact surfaces upon the extremities of said clutch elements, wedging and locking of the clutch is eliminated. Furthermore, galling and wear of the clutch elements and clutching surface is obviated because of the relatively large contact surfaces on the extremities of said clutch elements.

I claim as my invention:

1. In a bidirectional overrunning clutch, the combination of: a driving member having a cylindrical clutch surface on its inner wall; a driven member mounted within said driving member and having flattened surfaces upon the opposite sides thereof; a pair of elongated clutch elements located within said driving member on opposite sides of the driven member and having arcuate extremities engageable with said clutch surface, said clutch elements being free floating with respect to said driving and driven members and having opposed surfaces engageable by said flattened surfaces, said elements being of a length sufficient to span the chordal distance on either side of the driven member to engage said clutch surface; and a pair of compression springs located on opposite sides of said driven members and having their opposite extremities engaging said opposed surfaces of said clutch elements.

2. In a bidirectional overrunning clutch, the combination of: a driving member having a cylindrical clutch surface on its inner wall; a driven member constituted by a shaft having an extremity provided with oppositely disposed flats located within said driving member; a pair of elongated clutch bars located on opposite sides of said shaft extremity and having opposed surfaces juxtaposed to said flats, said clutch bars having arcuate extremities engageable with said clutch surface and being of a length sufficient to span the chordal distance on either side of the driven member to engage said clutch surface; compression springs located between said bars and urging them outwardly into engagement with said clutch surface; and arcuate release fingers located adjacent said clutch surface and having their opposite edges engageable with opposite extremities of a juxtaposed clutch bar.

3. In a bidirectional overrunning clutch, the combination of: a driving member having a cylindrical clutch surface on its inner wall; a driven member constituted by a shaft having an extremity provided with oppositely disposed flats located within said driving member; a pair of elongated clutch bars located on opposite sides of said shaft extremity and having opposed surfaces juxtaposed to said flats, said clutch bars having arcuate extremities engageable with said clutch surface and being of a length sufficient to span the chordal distance on either side of the driven member to engage said clutch surface; a pair of compression springs located on opposite sides of said shaft and having their opposite extremities engaged upon said opposed surfaces of said bars; and arcuate release fingers located adjacent said clutch surface and having their opposite edges engageable with opposite extremities of a juxtaposed clutch bar.

4. In a bidirectional overrunning clutch, the combination of: a housing constituting a driving member and providing an annular clutch surface on the interior thereof; a driven member located within said housing constituted by a shaft having opposed flats thereupon; a pair of clutch bars located within said housing and having arcuately formed clutching faces engageable with said clutch surface, said clutch bars being free floating, disposed on opposite sides of said shaft and having opposed surfaces juxtaposed to said flats and being of a length sufficient to span the chordal distance on either side of the driven member to engage said clutch surface; compression springs located between said opposed surfaces of said bars and having their opposite ends seated upon said surfaces; and arcuate release fingers located adjacent said clutch surface and having their opposite edges engageable with opposite extremities of a juxtaposed clutch bar.

References Cited in the file of this patent

UNITED STATES PATENTS

| | | |
|---|---|---|
| 1,160,529 | Pinkham | Nov. 16, 1915 |
| 2,359,010 | Smith | Sept. 26, 1944 |
| 2,373,462 | Crow | Apr. 10, 1945 |
| 2,681,718 | Stoner | June 22, 1954 |

FOREIGN PATENTS

| | | |
|---|---|---|
| 988,570 | France | May 9, 1951 |
| 871,860 | Germany | Mar. 26, 1953 |